United States Patent [19]

Hyde

[11] 4,341,673

[45] Jul. 27, 1982

[54] METHACRYLATE POLYMER CONCRETE MIX WITH REDUCED SHRINKAGE DURING CURE COMPRISING (A) PARAFFINIC OIL AND (B) $C_2$-$C_4$ ALKYL METHACRYLATE

[75] Inventor: Thomas J. Hyde, Wilmington, Del.

[73] Assignee: E. I Du Pont de Nemours and Company, Wilmington, Del.

[21] Appl. No.: 273,632

[22] Filed: Jun. 15, 1981

[51] Int. Cl.$^3$ .......................... C08K 5/01; C08L 13/04
[52] U.S. Cl. ..................................... 524/272; 524/474; 524/400; 524/533; 525/309
[58] Field of Search .................. 260/33.6 VA, 28.5 R, 260/27 R; 525/309

[56] References Cited

U.S. PATENT DOCUMENTS

| T911,012 | 6/1973 | Liesemer | 525/309 |
| 2,901,454 | 8/1959 | Stewart | 260/33.6 VA |
| 3,538,036 | 11/1970 | Peters et al. | 260/29.65 |
| 3,637,559 | 1/1972 | Pinkney | 260/28.5 R |

FOREIGN PATENT DOCUMENTS 2017732 10/1979 United Kingdom ................ 525/309

OTHER PUBLICATIONS

Chem. Abs. 83-98734d (1975), Kasahara et al.

Primary Examiner—Paul Lieberman
Assistant Examiner—Herbert J. Lilling

[57] ABSTRACT

The tendency of uncured methacrylate polymer concrete to shrink during curing is reduced by the presence of a selected paraffinic oil and a polymer of a $C_2$-$C_4$ alkyl methacrylate. The oil and the polymer are present in the liquid mixture component.

5 Claims, No Drawings

METHACRYLATE POLYMER CONCRETE MIX WITH REDUCED SHRINKAGE DURING CURE COMPRISING (A) PARAFFINIC OIL AND (B) $C_2$-$C_4$ ALKYL METHACRYLATE

FIELD OF THE INVENTION

This invention relates to methacrylate polymer concrete mix and components thereof. The mix is employed to prepare or repair concrete surfaces or to prepare precast concrete members.

BACKGROUND OF THE INVENTION

Methacrylate polymer concrete mix (MPC) has been employed to patch and repair concrete surfaces, such as roadways, sidewalks, runways and flooring. For example, MPC material is described in British Pat. No. 983,826. To form a patch of MPC, methacrylate monomer is mixed with an aggregate and subsequently polymerized in situ after filling or covering the concrete area to be patched.

Once an initiator (usually a peroxide) and a promoter (usually an aromatic amine) have been added to the methacrylate monomer, polymerization takes place rapidly, in an hour or less in a typical case. For this reason it is a common practice to blend promoter with methacrylate monomer liquid and to blend peroxide initiator with aggregate, and to combine the two blends at the repair site just prior to pouring the combined MPC (mix) into or onto the patch area. Alternatively, but less desirably, aggregate can be placed in or on the area to be repaired, and peroxide initiator added to liquid methacrylate monomer mixture which already contains promoter, and this liquid mixture poured over the aggregate so as to wet the aggregate particles.

Commonly, the aggregate (sometimes referred to hereinafter as powder mixture) will contain inorganic fillers such as silica, clays, silicates, hydrated alumina, or carbonates of various particle sizes, colorants such as titanium dioxide and/or iron oxide, a polymerization initiator for methyl methacrylate monomer, a small amount of a plasticizer such as an organophosphate and a small amount of a methacrylate polymer. Commonly, also, the monomer liquid (referred to hereinafter as liquid mixture) will contain mostly methacrylate monomer along with a small amount of a polymerization promoter such as N,N-dimethyl toluidine.

At the repair site, the aggregate and the monomer mixture, i.e., liquid mixture, are combined, mixed, and poured onto the patch area. The polymerization initiator in the aggregate initiates polymerization of the methacrylate monomer and the combined mixture, which is MPC, begins to cure through polymerization of the methacrylate. Upon completion of polymerization, the cured material is hard and concretelike.

It is known that a blend of particulate silica in the aggregate, in which the particulate is of varying sizes, is useful in reducing the spaces, of voids, between the particles. A packing material, such as calcium carbonate, may also be a part of the aggregate and aids in reducing the total void content. It is desirable to reduce the void content because, as the void content decreases, less monomer liquid is needed in the MPC. Less monomer liquid is desirable because the volume of the polymer formed is less than the volume of the corresponding monomer needed to form the polymer. Thus shrinkage occurs as the polymerization is carried out.

Even when the methacrylate liquid monomer concentration in the MPC has been reduced to a practical minimum which still meets troweling requirements (e.g., 4 to 7% methacrylate), the unrestrained shrinkage of such a casting has been determined to be about 0.20% or more. As a result, this shrinkage has caused cracking during cure of the MPC in large repairs or alternately has imparted built-in stress which has led to early failure under heavy service conditions in some cases.

The addition of a paraffinic oil to the formulation has reduced the cracking tendency of MPC in small repairs. However, the presence of paraffinic oil did not eliminate cracking in larger repairs. Also, the presence of paraffinic oil did not reduce the percent unrestrained shrinkage during cure, which is a measure of the unrelieved stress in the MPC casting. It is highly desirable to reduce the built-in stress in MPC repairs, so that the desired longevity of many years of service can be attained.

SUMMARY OF THE INVENTION

The tendency of methacrylate polymer concrete mix (i.e., MPC) to shrink during cure and to develop cracks in large installations was not significantly reduced by the separate addition to the methacrylate monomer of paraffinic oil or of an acrylic polymer synthesized from a $C_2$-$C_4$ alkyl methacrylate. However, surprisingly, when these two additives were combined in the composition, shrinkage during cure and cracking of field installations was greatly reduced. The specified type of acrylic polymer must be dissolved in the methyl methacrylic monomer prior to cure to be effective.

DESCRIPTION OF THE INVENTION

I. The Aggregate or Powder Mixture (a) Inorganic Fillers

Particle size distribution of the aggregate was selected to promote efficient packing of particles and reduce void volume between particles. In this way the amount of methacrylate monomer and other liquids required to wet the aggregate can be reduced.

Particles with different size distributions are blended to attain a mixture in close agreement with the particle size distribution specified in Method C-33 of the ASTM. Also rounded particles are preferred over particles with angular, irregular surfaces. A list of a typical blend of silica particles which were found useful is set forth in Example 1. The amount of inorganic filler present in the powder mix can range from 60 to 90% by weight.

The inorganic particles of smallest diameter, predominantly passing the No. 200 (75 $\mu$m) sieve, are of critical importance in the formulation because these particles have the greatest surface area per unit volume. Therefore, these particles have a considerable effect on the amount of methacrylate monomer and other liquids required to obtain a workable MPC slurry. For convenience herein, these particles will be called "inorganic fines". The inorganic fines ordinarily are selected from plentiful, low-cost materials such as amorphous silica or calcium carbonate or alumina trihydrate, each with average particle size less than 75 $\mu$m. The amount of inorganic fines present in the aggregate can range from 0.5 to 30% by weight.

(b) Colorants

Inorganic pigments are often added to obtain a light gray color or off-white color similar to that of portland cement concrete. In this way, when MPC is used to repair conventional concrete, the two materials are similar to color. A blend of titanium dioxide and black iron oxide provides the desired color. The shading of gray color can be varied as desired by adjusting the ratio of the two pigments.

Generally, the amount of colorant, if present, in the aggregate can range from 0.3 to 3.0% by weight.

(c) Polymerization Initiator

Ordinarily, the methacrylate initiator will be a peroxide initiator. Useful peroxide initiators include aromatic diacyl peroxides such as benzoyl peroxide and 2,4-dichlorobenzoyl peroxide. Also aliphatic diacyl peroxides, such as lauroyl peroxide, may be used provided that the ambient temperature at time of cure is 20° C. (68° F.) or warmer. Generally the initiator will be present in the aggregate in an amount of between 0.1 and 1.0% by weight.

(d) Plasticizer

The brittleness of the methacrylate polymer in MPC can be reduced by the addition of a liquid plasticizer. These plasticizers, which are widely known, include phthalate esters, phosphate esters, and liquid polyester plasticizers. Specific examples include isooctyl benzyl phthalate, di(2-ethylhexyl) azelate, tricresyl phosphate, and butyl phthalyl butyl glycolate. The addition of plasticizer is known to depress the glass transition temperature of the polymer. The amount of plasticizer which may be added is limited by the fact that the glass transition temperature of the polymer must be above the maximum temperature encountered in a specific application and generally is no more than 3.0% by weight of the aggregate.

(e) Methacrylate Polymer

Methacrylate polymer is added in the form of minute spherical beads or crushed cubes. For purposes of identification herein, methacrylate polymer present as beads or crushed cubes in the powder mixture are referred to as Class I acrylic polymers. The function of this material is to swell when it comes into contact with methacrylate monomer and to seal off the surface of the MPC once it has been placed into a concrete repair area. As a result, loss of methacrylate monomer due to its volatility is greatly reduced. Examples of useful polymers include polymethyl methacrylate, copolymers of methyl methacrylate and ethyl acrylate, copolymers of methyl methacrylate and butyl methacrylate. Methacrylic acid may be used as a comonomer with any of the above combinations. The amount present in the powder mixture will generally be no more than 8.0% by weight.

II. The Liquid Mixture

The liquid mixture is composed mostly of a methacrylate monomer, e.g., 75% or more by weight of the mixture. Typical methacrylate monomers which may be used are methyl methacrylate (MMA), ethyl methacrylate, butyl methacrylate, 2-ethylhexyl methacrylate, and mixtures thereof, and small amounts of crosslinking monomers such as ethylene glycol dimethacrylate and trimethylolpropane trimethacrylate. Also methacrylic acid may be used as a comonomer. Methyl methacrylate may be used as the sole monomer, or it may be used in a blend with a second monomer, provided that the glass transition temperature of the cured MPC is above the maximum temperature encountered in a specific application. For example, in highway applications, the maximum temperature for most climates in the United States is 50° C. (120° F.). The compressive strength of the polymer concrete declines at temperatures close to the glass transition temperature of the MPC.

A polymerization promoter is also present in the liquid mixture. Certain aromatic tertiary amine promoters are preferred. Useful aromatic amine promoters include N,N-dimethyl-p-toluidine (DMPT); N,N-dimethylaniline; N,N-diethylaniline; and N-phenyldiethanolamine. The concentration of aromatic amine may vary from 0.5 to 4.0% of the liquid mixture.

A surfactant may be added to the liquid mixture or the solid mixture to promote the wetting and mixing of solids with liquids. Examples include the alkaline earth metal salts of resin acids or alkaline earth metal salts of saturated carboxylic acids such as naphthenic acids, 2-ethyl-hexanoic acid, neodecanoic acid, or the like. Also, nonionic surfactants may be used.

III. Definition of Acrylic Polymers and Paraffinic Oils That are Effective in Shrinkage Reduction The critical ingredients for reduction in shrinkage during cure and for elimination of cracks in the cured MPC are 5 to 12% of a paraffinic oil and 4 to 10% of a specific type of acrylic polymer. These percents are based on weight of liquid mixture.

To obtain the benefit of reduction of unrestrained skrinkage in MPC, it has been found that the liquid mixture (which is chiefly methacrylate and usually MMA) must contain two ingredients: (1) 5 to 12% of a paraffinic oil and (2) 4 to 10% of an acrylic polymer synthesized from ethyl, propyl, or butyl methacrylate.

Examples of acrylic polymers which were found to be ineffective for shrinkage reduction in MPC were as follows:

Polymethyl methacrylate

Poly(methyl methacrylate/ethyl acrylate—95.5/4.5 by weight or 87/13 weight)

Poly(methyl methacrylate/n-butyl methacrylate/methacrylic acid—70/29/1 by weight). These polymers are outside the claims of the present invention.

Acrylic polymers whose units contain at least 90% by weight ethyl, propyl or butyl methacrylate are referred to herein as Class II acrylic polymers, for convenience herein. Examples of Class II acrylic polymers which are effective in shrinkage reduction are as follows:

Polyethyl methacrylate

Poly(n-propyl methacrylate)

Poly(n-butyl methacrylate)

Polyisopropyl methacrylate

Polyisobutyl methacrylate. Also copolymers synthesized from ethyl, propyl, or butyl methacrylate monomers are effective in shrinkage reduction. Small amounts (less than 5%) of methacrylic acid may be used as a third monomer in the Class II acrylic polymers. Examples are as follows:

Poly(ethyl methacrylate/n-butyl methacrylate/methacrylic acid—59/39/2 by weight)

Poly(n-butyl methacrylate/isobutyl methacrylate—50/50 by weight). Use of polymers based on methacrylate monomers derived from $C_5$ or higher alkanols is not preferred because such compositions are soft and detract from the abrasion resistance and heat resistance of the cured MPC.

As an additional prerequisite, it has been found that the Class II acrylic polymers must be dissolved in the liquid mixture to be effective. When the Class II acrylic polymer is added as a finely divided powder to the powder mixture, a significant reduction in shrinkage of the MPC during cure is not attained.

Useful paraffinic oil additives are made up of at least 60% paraffins and have a boiling point above 200° C. By "paraffinic oil" is meant a mixture of saturated aliphatic hydrocarbons, i.e., an alkane structure, having a boiling point above 200° C. Examples of such paraffinic oils include paraffinic oil A, which was analyzed as containing 99% paraffinic hydrocarbons and had a viscosity of 12.8 centistokes at 37.8° C. (100° F.) and a specific gravity of 0.857 at 25° C. (77° F.); and paraffinic oil B, which is a processing oil that was analyzed as containing 69% paraffinic hydrocarbons, 27% naphthenic hydrocarbons, and 4% aromatic hydrocarbons. Oils A and B had boiling points above 200° C. and were effective in the invention described herein. In contrast, a hydrocarbon which consisted of paraffinic and naphthenic hydrocarbons and had a boiling range of 150° to 180° C. was found to be ineffective in this invention. Such a hydrocarbon would lack permanence in the cured MPC.

IV. Combination of Aggregate and Liquid Mixture

The aggregate and the liquid mixture are simply poured together in amounts ranging from 90–96 parts of aggregate and 10-4 parts of liquid mixture and are mixed by ordinary means. A preferred method of mixing is in an ordinary cement mixer. The resulting slurry is poured onto the concrete area to be patched and is then cured. The cure is ordinarily carried out at prevailing ambient temperatures ($-7°$ C. to 50° C.; 20° F. to 120° F.), with no external heat source applied. To attain a useful rate of cure at ambient temperatures in 8 hours or less, preferably in about one hour, the composition contains both an organic peroxide initiator and a tertiary aromatic amine which acts as a promoter.

V. Shrinkage

Shrinkage was measured on castings (8.0"×20.0"×2.0" thick) which weigh about 32 lbs. The mold was a plywood box which had been coated with grease and then lined with polyethylene film. Thus, the casting was unrestrained in the sense that it did not adhere to the mold. After the mold was filled with the wet mix, two probes (each 2"×2"×0.25" thick) were inserted into the mix, 10 inches apart. One of these probes was unrestrained and moved freely as the casting shrank during cure. The movement of the probe was detected by a Bently-Nevada transducer and recorded on a strip chart. Results for specific compositions are reported in the Examples.

Concurrently, large installations of MPC were made in the field, to demonstrate utility. A typical installation measured 4 ft.×12 ft.×2.2 inches thick and utilized 1,400 lbs. of MPC. Details are contained in the Examples.

EXAMPLE 1

This example compares the performance of liquid mixture IV, which is within the scope of the invention described herein, with the performance of liquid mixtures I, II, and III, which are not within the scope of the invention.

| Liquid Mixture (Parts by Weight) | I | II | III | IV |
|---|---|---|---|---|
| Methyl Methacrylate | 97.3 | 87.7 | 93.3 | 84.6 |
| Dimethyl p-Toluidine | 0.80 | 0.80 | 0.80 | 0.80 |
| Paraffinic Oil A | None | 9.0 | None | 9.0 |

| Liquid Mixture (Parts by Weight) | I | II | III | IV |
|---|---|---|---|---|
| Acrylic Polymer E | None | None | 4.0 | 4.2 |
| Surfactant C | 1.9 | 2.5 | 1.9 | 1.4 |
| Total | 100.00 | 100.0 | 100.0 | 100.0 |

Paraffinic oil A is made up of 99% paraffinic hydrocarbons. This oil had a viscosity of 12.8 centistokes at 37.8° C. (100° F.) and a specific gravity of 0.857 at 25° C. (77° F.). Its boiling point was above 200° C.

Acrylic Polymer E is a Class II acrylic polymer of normal butyl methacrylate and isobutyl methacrylate (50/50 by weight) with an inherent viscosity of 0.54. The inherent viscosity is measured on a solution containing 0.25 g polymer in 50 ml methylene chloride, measured at 20° C. using a Cannon-Fenske viscometer.

Surfactant C is the zinc salt of resin acid, a natural product which is chiefly abietic acid. The zinc content was 8.0% by analysis.

Aggregate I was prepared by mixing the following:

| Ingredient | Major Fraction U.S. Standard Sieve Size Pass | On | % by Weight |
|---|---|---|---|
| Sandblast Sand A | No. 8 | No. 16 | 23.87 |
| Sandblast Sand B | No. 30 | No. 100 | 18.13 |
| Silica Sand A | No. 30 | No. 50 | 25.58 |
| Silica Sand B | No. 50 | No. 100 | 8.11 |
| Silica Sand C | No. 50 | No. 200 | 2.48 |
| Silica Sand D | No. 100 | No. 200 | 2.48 |
| Silica Flour | No. 200 | | 11.94 |
| Titanium Dioxide | No. 325 | | 0.62 |
| Iron Oxide | No. 325 | | 0.06 |
| Benzoyl Peroxide/ CaHPO$_4$.2H$_2$O (35/65 by weight) | No. 325 | | 0.90 |
| Acrylic Polymer G | No. 20 | No. 200 | 3.95 |
| Isodecyl Diphenyl Phosphate | | Liquid | 1.88 |

Acrylic Polymer G is a Class I acrylic polymer of methyl methacrylate and ethyl acrylate (95/5 by weight) with an inherent viscosity of 0.52.

In separate tests, 47 parts of aggregate I were mixed with 47 parts of coarse gravel ($\frac{3}{8}$ inch average diameter), referred to hereinafter as Gravel A, and with 6.2±0.2 parts of liquid mixtures I through IV. The components were mixed in a standard concrete mixer for two minutes, to simulate mixing under roadside conditions. Then the mix was placed and troweled in a mold coated with grease and lined with polyethylene film to eliminate adhesion to the mold. The dimensions of the mold were 8"×20"× 2" thick. The casting weighed 32 lbs. The probes were inserted in the wet concrete, with a distance of 10 inches between the probes. The movement of the probes was recorded over a period of 18 hours. Substantially all the shrinkage was completed within four hours after mixing the ingredients. The following results were observed on the concrete castings which contained liquid mixtures I through IV:

| | I | II | III | IV |
|---|---|---|---|---|
| % Shrinkage | 0.20 | 0.20 | 0.19 | 0.07 |

MPC based on liquid mixture IV was prepared in triplicate, to demonstrate reproducibility. The shrinkage results were 0.06%, 0.08%, and 0.07%. These results show that the presence of either paraffinic oil or Class II acrylic polymer by itself did not reduce the shrinkage of the polymer concrete. However, the combined use of these two additives reduced the shrinkage by a factor of three.

EXAMPLE 2

In this example, three paraffinic oils were evaluated for their effect on shrinkage of MPC during cure. The procedure of Example 1 was followed. Aggregate I and modifications of liquid mixture IV were mixed with Gravel A in the proportions described in Example 1. The paraffinic oil component in liquid mixture IV was varied as noted below. The concentration of the paraffinic oil was 9.0% of the liquid mixture in each case.

Paraffinic oil A consisted 99% paraffinic hydrocarbons, as described in Example 1. Paraffinic oil B was an oil which consisted of 69% paraffinic, 27% naphthenic, and 4% aromatic hydrocarbons. Its boiling point was above 200° C. When the oil was heated 3 hours at 325° F., only 0.11 weight % was volatilized. Its viscosity was 72 centistokes at 38° C. (100° F.), and its specific gravity was 0.873 at 15° C. (60° F.). Paraffinic solvent C consisted of 64% paraffinic, 36% naphthenic, and less than 1% aromatic hydrocarbons. Its boiling range was 120° to 140° C. (250° to 284° F.). Paraffinic oils A and B are within the scope of the invention, while the paraffinic solvent C is outside the scope of the invention. The following shrinkages were recorded:

| Hydrocarbon | % Shrinkage |
| --- | --- |
| Paraffinic Oil A | 0.07 |
| Paraffinic Oil B | 0.08 |
| Paraffinic Solvent C | 0.35 |

These results show that the paraffinic oils reduced shrinkage in MPC, whereas the paraffinic solvent was ineffective.

EXAMPLE 3

In this example, six methacrylate polymers were evaluated as Class II acrylic polymers for their effect on shrinkage of MPC during cure. The procedure of Example 1 was followed. Aggregate I and modifications of liquid mixture IV were mixed with Gravel A in the proportions described in Example 1. The Class II acrylic polymer component in liquid mixture IV was varied as noted below. The concentration of Class II polymer was 4.2% of the liquid mixture in each case. Class II acrylic polymers B through F are within the scope of the invention, whereas acrylic polymer A (polymethyl methacrylate) is outside the scope of the invention.
The polymers and shrinkage results are tabulated below.

| Polymer Code | Methacrylate Content (%) of Resin | Inherent Viscosity of Polymer | % Shrinkage in MPC |
| --- | --- | --- | --- |
| A | Methyl (100) | 0.18 | 0.24 |
| B | Ethyl (100) | 0.83 | 0.11 |
| C | Butyl (100) | 0.52 | 0.02 |
| D | Isobutyl (100) | 0.63 | 0.07 |
| E | Butyl/Isobutyl (50/50) | 0.54 | 0.07 |
| F | Ethyl/Butyl/MAA* | 0.24 | 0.08 |

*MAA = Methacrylic Acid (59/39/2 by weight)

These results show that the addition of polymethyl methacrylate produced no reduction in shrinkage of MPC compared to the control sample (solution I of Example 1). However, the addition of polymers and copolymers based on ethyl methacrylate and butyl methacrylate did reduce shrinkage of MPC by a factor of three in the average case.

EXAMPLE 4

The procedure of Example 1 was followed. Aggregate I and modifications of liquid mixture IV were mixed with Gravel A in the proportions described in Example 1. The concentrations of paraffinic oil A and Class II acrylic polymer E were varied as listed below, to determine the effects of these concentrations on the shrinkage of MPC.

| % of Liquid Mixture | | % Shrinkage on Cure of MPC |
| --- | --- | --- |
| Methacrylate Polymer E | Paraffinic Oil A | |
| 2.0 | 9.0 | 0.22 |
| 4.0 | 4.5 | 0.24 |
| 4.2 | 5.9 | 0.10 |
| 4.2 | 9.0 | 0.07 |
| 8.0 | 9.0 | 0.02 |

If at least 4.2% of resin E and 5.9% of paraffinic oil were present in the liquid mixture, the shrinkage on cure was reduced by a factor of two or more.

EXAMPLE 5

This example compares the addition of a copolymer of ethyl and butyl methacrylate to the Aggregate I with addition of the copolymer to the liquid mixture. The procedure of Example 1 was followed. Liquid mixture I and a modification of Aggregate I were mixed with Gravel A in the proportions described in Example 1. The modification of Aggregate I consisted of adding 2.0% of Class II acrylic polymer F (described in Example 3) to the aggregate. The shrinkage of the MPC during cure was 0.15%. When Class II acrylic polymer F was added to the liquid mixture as described in Example 3, the shrinkage was only 0.08%.

EXAMPLE 6

Various surfactants were effective in promoting the working properties and trowelability of the wet mixture of MPC prior to cure. The procedure of Example 1 was followed. Powder mixture I and modifications of liquid mixture IV were mixed with Gravel A, at a weight ratio of 47/6.2/47. The modifications consisted of the replacement of surfactant C with various other surfactants in the liquid mixture.

Surfactant A was a solution of 64% calcium naphthenate in mineral spirits. Surfactant B was a solution of 75% calcium neodecanoate in mineral spirits. Surfactant D was a solution of 70% calcium salts of mixed $C_8$ to $C_{12}$ aliphatic carboxylic acids in mineral spirits. Surfactant E was a solution of 60% mixed calcium/zinc- /magnesium salts of resin acid in 40% lactol spirits. Surfactant F was a 52% solution of a polymeric acrylic dispersant in toluene. The shrinkage of MPC during cure was measured:

| Surfactant Code | Parts Added to Liquid Mixture | % Shrinkage of MPC During Cure |
|---|---|---|
| A | 4.0 | 0.06 |
| B | 4.0 | 0.08 |
| D | 4.0 | 0.03 |
| E | 4.0 | 0.01 |
| F | 2.0 | 0.08 |

The average shrinkage was 0.05%; the range of shrinkages was 0.01 to 0.08%.

EXAMPLE 7

In this Example, the presence and absence of surfactant is tested for its effect on cure shrinkage of MPC. The procedure of Example 1 was followed using Aggregate I and liquid mixtures modified from Example 1 as described below. These were mixed with gravel as described in Example 1.

Surfactant A was a solution of 64% Calcium Naphthenate in mineral spirits. Acrylic Polymer E is the same as mentioned in Example 1. Paraffinic Oil A and Dimethyl-p-Toluidine are maintained at 9.0 and 0.8 parts by weight of liquid respectively. The remainder of the liquid is Methyl Methacrylate Monomer.

| Liquid Mixture | % Surfactant A | % Acrylic Resin E | % Shrinkage on Cure |
|---|---|---|---|
| A | 2% | 4% | 0.092 |
| B | 0% | 4% | 0.120 |
| C | 2% | 0% | 0.228 |
| D | 0% | 0% | 0.195 |

Thus mixtures with or without surfactant provide low shrinkages when the critical components, Acrylic Polymer Type II and Paraffinic Oil, are present.

EXAMPLE 8

In this example, large overlays (1,400 lbs. each) of two MPC formulations were installed on top of a worn surface of conventional portland cement concrete. In each case, the final dimensions of the overlay were 12 ft.×4 ft.×2.2 inches thick. The performance of two liquid mixtures was compared. Liquid mixture IV (as defined in Example 1) is within the scope of the invention described herein, whereas liquid mixture II (as defined in Example 1) is outside the scope of the invention.

First the worn surface was coated with a clear methacrylate primer, applied with a paintbrush. The primer consisted of the following:

| Ingredient | % by Weight |
|---|---|
| Methyl Methacrylate | 85.7 |
| Methacrylate Copolymer H | 12.0 |
| 1,3-Butylene Glycol Dimethacrylate | 1.0 |
| N,N-Dimethyl-p-Toluidine | 0.3 |
| gamma-Methacryloxypropyltrimethoxysilane | 1.0 |

Methacrylate copolymer H is a copolymer of methyl methacrylate and ethyl acrylate (95/5 by weight) with an inherent viscosity of 0.44. At the time of use, the cure of the primer was initiated by dissolving 1.6 parts of a mixture of benzoyl peroxide and dicyclohexyl phthalate (50/50 by weight) in one hundred parts of primer, at an ambient temperature of 80° F. (27° C.). Once the initiator has been added, the working pot life for the primer is about 30 minutes before the primer cures. For best results, the amount of benzoyl peroxide should be adjusted to compensate for changes in the ambient temprature. The primer was allowed to dry for 5 minutes.

Then liquid mixture II, Aggregate I, and Gravel A were charged to a conventional cement mixer at a ratio of 6.2/47.0/47.0 parts of weight. The charge weighed 350 lbs. and was mixed for 2.0 minutes. The slurry was discharged into the area to be covered, which was framed by a wooden form. The slurry was placed by conventional tools (shovel, vibrating screed, and trowel) to yield a block which was 3 ft.×4 ft.×2.2 inches thick. Three additional batches were mixed and placed as 3 ft.×4 ft. blocks which were contiguous with each other. The end result was an overlay which was 12 ft. long by 4 ft. wide by 2.2 inches thick. The boundaries between contiguous blocks were mixed thoroughly with a rake and vibrator, to promote adhesion between the four batches. The MPC cured to a hard mass in less than two hours.

The procedure was repeated, except that liquid mixture II was replaced by an equal amount of liquid mixture IV. Once again the MPC cured to a hard mass in less than 2 hours. After an overnight cure, both overlays showed no signs of cracking. The compressive strength of each composition was determined to be 6,000 psi. After the two overlays were allowed to age for 4 months, the overlay derived from liquid II had developed a crack 38 inches in length, while the overlay derived from liquid IV showed no signs of cracking. The failure of the first overlay was attributed to the development of internal stresses, which eventually caused the crack development. The second overlay, which contained paraffinic oil and poly(n-butyl methacrylate/isobutyl methacrylate) dissolved in the liquid mixture prior to cure, did not develop cracks. These results with overlays confirmed the laboratory shrinkage results of Example 1.

EXAMPLE 9

In this example, large overlays (4 ft.×12 ft.×2.0 inches) were installed as in Example 8, except that Gravel A (average diameter of 0.35 inches) was replaced by a widely used sandblast sand (with a code name of SBS #4; average diameter of 0.14 inches), in order to obtain a smoother surface on the cured MPC overlay. To make a workable and trowelable mass with SBS #4, the liquid concentration had to be raised from 6.2% of Example 8 to 8.0%. The ratio of liquid mixture/Aggregate I/SBS #4 was 8.0/66.2/25.8. At the higher concentration of liquid (and MMA as the major component of the liquid), the control of shrinkage and cracking was considered to be more difficult.

This example compares the performance of liquid mixture VI which is within the scope of the invention with the performance of liquid mixture V which is outside the scope of the invention.

| Liquid Mixture (Parts By Weight) | V | VI |
|---|---|---|
| Methyl Methacrylate | 86.2 | 82.2 |

| Liquid Mixture (Parts By Weight) | V | VI |
|---|---|---|
| Dimethyl p-Toluidine | 0.80 | 0.80 |
| Paraffinic Oil A | 9.0 | 9.0 |
| Surfactant E | 4.0 | 4.0 |
| Class II Acrylic Polymer E (see Example 3) | — | 2.0 |
| Class II Methacrylic Polymer F (see Example 3) | — | 2.0 |
| | 100.0 | 100.0 |

Aggregate I was used in both cases.

First, the surface of the worn concrete was primed, as described in Example 8. Then liquid mixture V, Aggregate I, and SBS #4 were charged to a conventional cement mixer at a ratio of 8.0/66.2/25.8 parts by weight. The charge weighed 350 lbs. and was mixed for 2.0 minutes. The procedure of Example 8 was followed. The slurry was placed in a block (3 ft.×4 ft.×2.0 inches). Three additional batches were mixed and placed in contiguous blocks. The MPC cured to a hard mass in less than two hours.

The procedure was repeated, except that liquid mixture V was replaced by an equal amount of liquid mixture VI. Once again the MPC cured to a hard mass in less than two hours. After an overnight cure, both overlays showed no signs of cracking. The compressive strength of the first composition was 6,400 psi and that of the second composition was 5,200 psi. Both compositions had a density of 135 pcf.

After the two overlays were allowed to age for two months, the overlay derived from liquid mixture V had developed a series of cracks which totaled 81 inches in length. The cracks extended in random directions, sometimes called "map cracking". The overlay derived from liquid mixture VI showed no signs of cracking. These results illustrate the elmination of cracks based on 8.0% liquid mixture when paraffinic oil and methacrylate polymer derived from ethyl or butyl methacrylate are present in the liquid mixture prior to cure.

EXAMPLE 10

In this example, overlays (4 ft.×12 ft.×1.0 inch thickness) were installed by the general procedure of Example 8, except that the composition was a mortar based on liquid mixture and aggregate, with no coarse gravel added. The composition produced a smoother surface than that of Example 8 or 9. The ratio of liquid to aggregate was 8.2/91.8. Because of the higher concentrations of both liquid mixture and aggregate, compared to those concentrations used in Examples 8 and 9, the control of shrinkage and cracking was considered to be more difficult to attain.

This example compares the performance of liquid mixture VII and VIII which are within the scope of the invention with the performance of liquid mixture V which is outside the scope of the invention.

| Liquid Mixture (Parts by Weight) | V | VII | VIII |
|---|---|---|---|
| Methyl Methacrylate | 86.2 | 82.2 | 82.2 |
| Dimethyl p-Toluidine | 0.80 | 0.80 | 0.80 |
| Paraffinic Oil A | 9.0 | 9.0 | 9.0 |
| Surfactant E | 4.0 | 4.0 | 4.0 |
| Class II Acrylic Polymer E (see Example 3) | — | 4.0 | — |
| Class II Acrylic Polymer F (see Example 3) | — | — | 4.0 |
| | 100.0 | 100.0 | 100.0 |

Aggregate I was used in all cases.

First, the surface of the worn concrete was primed, as described in Example 8. Then liquid mixture V and Aggregate I were charged to a conventional cement mixer at a ratio of 8.2/91.8. The charge weighed 360 lbs. and was mixed for 2.0 minutes. The general procedure of Example 8 was followed, except that the thickness of the overlay was 1.0 inch. The slurry was placed in a block 6 ft.×4 ft.×1.0 inch. One additional batch was mixed and placed in a contiguous block. The MPC cured to a hard mass in less than two hours.

The procedure was repeated two more times, except that liquid mixture V was replaced by an equal amount of liquid mixture VII in one case and VIII in another case. The MPC cured to a hard mass in less than two hours. After an overnight cure, all three overlays showed no signs of cracking.

After the three overlays had been allowed to age for two months, the overlay derived from liquid mixture V had developed a series of cracks which totaled 88 inches in length. The cracks extended in random directions. The overlays derived from liquid mixtures VII and VIII showed no signs of cracking. These results illustrate the elimination of cracks based on 8.2% liquid mixture when paraffinic oil and methacrylate polymer derived from ethyl or butyl methacrylate are present in the liquid mixture prior to cure.

EXAMPLE 11

This Example illustrates the use of calcium carbonate as the inorganic fines, with an average particle size less than 75 μm. The procedure of Example 1 was followed. Aggregate I was modified by the replacement of silica flour by an equal weight of calcium carbonate, with an average particle size less than 75 μm. This mixture was called Aggregate II. Aggregate II and liquid mixtures were mixed with Gravel A in the proportions described in Example 1. The following shrinkages were recorded:

| Using Liquid Mixture (From Example 1) | % Shinkage |
|---|---|
| II | 0.20 |
| IV | 0.09 |

The liquid mixture which contained paraffinic oil and acrylic resin Type II reduced the shrinkage by a factor of two.

I claim:

1. An improved methacrylate liquid mixture for use in making a methacrylic polymer concrete, wherein the improvement comprises including in the methacrylate liquid mixture:

(a) 5–12% by weight of liquid mixture of a paraffinic oil which contains at least 60% by weight of saturated aliphatic hydrocarbons and has a boiling point above 200° C.,
(b) 4–10% by weight of liquid mixture of an acrylic polymer wherein at least 90% by weight of the units of the acrylic polymer are derived from $C_2$–$C_4$ alkyl methacrylate.

2. An improved methacrylate liquid mixture for use in making a methacrylate polymer concrete consisting essentially of
   (a) 75% or more of a methacrylate monomer,
   (b) 0.5–4.0% of a polymerization promoter which promotes polymerization of the methacrylate monomer,
   (c) 0–4% of a surfactant which improves the wetting power of the liquid mixture,
   (d) 5–12% of a paraffinic oil which contains at least 60% by weight of saturated aliphatic hydrocarbons and has a boiling point above 200° C.,
   (e) 4–10% of an acrylic polymer wherein at least 90% by weight of the units of the polymer are derived from $C_2$–$C_4$ alkyl methacrylate, wherein said % of each component present is based on weight of liquid mixture.

3. The improved methacrylate liquid mixture of claim 2 wherein the methacrylate monomer is methyl methacrylate, the polymerization promoter is an aromatic tertiary amine, the surfactant is an alkaline earth metal salt of resin acid or saturated carboxylic acid.

4. The improved methacrylate liquid mixture of claims 1, 2 or 3 wherein the paraffinic oil contains 99% by weight of saturated aliphatic hydrocarbons, and the acrylic polymer is a copolymer of 50% units by weight of n-butyl methacrylate and 50% units by weight of isobutyl methacrylate.

5. A cured methacrylate polymer concrete prepared from an aggregate and a liquid mixture, in which the liquid mixture is the mixture defined in claim 1 or 2.

* * * * *